(12) United States Patent
Yamaguchi

(10) Patent No.: US 6,248,972 B1
(45) Date of Patent: Jun. 19, 2001

(54) PLASMA CUTTING METHOD, DEVICE AND GAS SUPPLY SYSTEM FOR PLASMA CUTTING TORCH

(75) Inventor: Yoshihiro Yamaguchi, Ishikawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/560,820

(22) Filed: Apr. 28, 2000

(30) Foreign Application Priority Data

Apr. 30, 1999 (JP) .................................................. 11-124479

(51) Int. Cl.[7] .................................................. B23K 10/00
(52) U.S. Cl. .............................. 219/121.39; 219/121.44; 219/121.55
(58) Field of Search .................. 219/121.5, 121.39, 219/121.44, 121.59, 121.55, 121.51, 74, 75, 121.46

(56) References Cited

U.S. PATENT DOCUMENTS

| | | |
|---|---|---|
| 5,017,752 | 5/1991 | Severance, Jr. et al. . |
| 5,166,494 * | 11/1992 | Luo et al. ........................ 219/121.55 |
| 5,290,995 * | 3/1994 | Higgine et al. .................. 219/121.44 |
| 5,396,043 * | 3/1995 | Couch, Jr. et al. ................ 219/121.5 |
| 5,900,168 * | 5/1999 | Saio et al. ....................... 219/121.44 |

FOREIGN PATENT DOCUMENTS

| | | |
|---|---|---|
| 49-8622 | 2/1974 | (JP) . |
| 61-92782 | 5/1986 | (JP) . |
| 3-258464 | 11/1991 | (JP) . |
| 9-239545 | 9/1997 | (JP) . |
| 10-314951 | 2/1998 | (JP) . |

* cited by examiner

*Primary Examiner*—Mark Paschall
(74) *Attorney, Agent, or Firm*—Armstrong, Westerman, Hattori, McLeland & Naughton, LLP (57) ABSTRACT

In oxygen plasma cutting, wear of the nozzle and electrode is reduced. Hafnium and/or zirconium are employed for the electrode material. Pure nitrogen gas is employed as the working gas in pilot arc formation. During cutting, a mixed gas of oxygen and nitrogen of oxygen concentration 70 to 95 mol % (preferably at least 80 mol %) and of nitrogen concentration 30 to 5 mol % (preferably 5 to 10 mol %) is employed as the working gas. The electrode is nitrided by using pure nitrogen gas as working gas from the point where cutting is terminated and the arc about to be extinguished onwards.

15 Claims, 12 Drawing Sheets

PLASMA CUTTING METHOD, DEVICE AND GAS SUPPLY SYSTEM FOR PLASMA CUTTING TORCH

BACKGROUND OF THE INVENTION

1. Field of the Invention

The present invention relates to cutting techniques using a plasma arc, and in particular relates to improvements in techniques for reducing wear of the electrode or nozzle in a plasma cutting method employing a working gas containing oxygen.

2. Description of the Related Art

Plasma cutting methods using a working gas (plasma gas) containing oxygen are appropriate to the cutting of low alloy steel or low carbon steel (soft steel). It is known that, since, in this plasma cutting method, the electrode within the plasma torch is exposed to oxygen, hafnium is ideal as the material of this electrode (material of the heat resistant insert mounted at the electrode tip) (Japanese Patent Publication No. Sho. 49-8622). This is because when hafnium forms an oxide its melting point rises to about 2800–2900° C., thus exhibiting excellent heat resistance. In practically all of the currently implemented plasma cutters using oxygen or air as working gas, hafnium is used for the electrode. Also, since zirconium has practically the same properties as hafnium, it is suitable for electrode material in an oxidizing atmosphere.

In plasma cutting, the nozzle and electrode are worn when the arc is generated. There are many causes of wear of the nozzle and arc, but the modes of wear that are caused by the arc itself when an oxidizing working gas is employed are as follows.

Firstly, the electrode and nozzle are worn when the pilot arc (between the electrode and nozzle) is initially ignited. At the instant when the pilot arc is ignited, the surface temperature of the hafnium constituting the electrode is instantaneously raised from room temperature to a high temperature exceeding 3000° C. and at this point there occurs rapid wear of the hafnium. The wear of the hafnium in this transient condition, even though it lasts only about 0.1 second, may correspond to the wear occurring in about one minute in the subsequent condition in which the hafnium has stabilized at high temperature. Also, whilst the pilot arc (between the electrode and nozzle) exists, the nozzle is placed under the same condition as the work during cutting and so is melted away in an oxidizing atmosphere.

Secondly, the electrode is worn when cutting is performed by establishment of the main arc (between the electrode and work). Although the hafnium of the electrode is stable at high temperature during cutting, so its rate of wear is lower than when the pilot arc is ignited, wear does proceed, and the hafnium is gradually consumed like a burning candle becomes shorter.

Regarding the problem of wear of the electrode and nozzle by the arc, Laid-open Japanese Patent Application No. Sho. 61-92782 discloses a method of starting plasma cutting wherein, at the start (including not just the interval of pilot arcing, but also piercing when the main arc is subsequently established), a mixture of oxygen gas and nitrogen gas of oxygen concentration 70–10 mol % is supplied as a working gas, changeover being subsequently effected to oxygen gas. Also, Laid-open Japanese Patent Application No. H. 3-258464 (U.S. Pat. No. 487,747) discloses a method of starting plasma cutting wherein nitrogen gas is employed during pilot arcing, but subsequently a changeover to oxygen gas is effected. In this way, wear of the hafnium electrode or nozzle during pilot arcing can be reduced by lowering the oxygen concentration of the working gas or eliminating the oxygen during pilot arcing.

As described above, with the object of reducing wear of the electrode or nozzle, the oxygen concentration of the working gas is lowered, or pure nitrogen gas is employed at the start of cutting, in Laid-open Japanese Patent Application No. Sho. 61-92782 and Laid-open Japanese Patent Application No. H. 3-258464. However, in all these cases of the prior art, during cutting, pure oxygen gas is employed as working gas(Laid-open Japanese number Sho. 61-92782, Laid-open Japanese Patent Application No. H. 3-258464) or working gas of the very high oxygen concentration of more than oxygen concentration 95 mol % is employed (Japanese Patent Publication No. H. 1-9112). Consequently, wear of the hafnium electrode during cutting cannot be effectively suppressed.

Thus in the prior art, the reasons for employing pure oxygen gas or working gas of high oxygen concentration approximating to pure oxygen in plasma cutting using a hafnium electrode with an oxidative working gas are believed to be as follows.

Firstly, even if pure oxygen gas is employed (albeit there is the problem of high running costs due to the need to change the electrode frequently), the life of the hafnium electrode is practicable i.e. at least some hours, so long as particularly large-current plasmas are not employed. On the other hand, if the oxygen concentration of the working gas is lowered in order to reduce electrode wear, the cutting quality is correspondingly lowered. Lowering of cutting quality is a problem that cannot be neglected. Pure oxygen gas is therefore employed in order to obtain best cutting quality, even though it causes high running costs.

Secondly, even if a mixed gas constituted by adding for example nitrogen to oxygen gas was employed as the working gas instead of pure oxygen gas, with the conventional working gas supply system, changes occurred in the respective gas flow rates during cutting, so it was not possible to maintain the mixing ratio of the oxygen and nitrogen at the optimum value right through cutting. Specifically, in the conventional gas supply system, one or other of the following two methods was adopted in order to set the gas flow rates to the target values. The first of these is the method of setting the pressure of the gas that is supplied to the torch to the target value by means of a pressure reduction valve. Second is the method of setting the flow rate to the target value using a needle valve and flow rate meter. In both methods, the gas flow rate can only be maintained at the target value if the pressure loss within the torch is constant. However, during the cutting, deterioration of the nozzle and wear of the electrode occur, resulting in changes in the pressure loss within the torch and correspondingly causing the gas flow rate to depart from the target value. Specifically, the pressure loss within the torch decreases during the progress of cutting, resulting in a gradual increase of the gas flow rate. For example in some cases the flow rate may increase by a factor of 3 at the end of cutting compared with the new-product condition at the commencement of cutting. Thus the gas flow rate changes during cutting, so the oxygen concentration of the working gas cannot be maintained constant at the optimum value. Accordingly, simple pure oxygen gas is employed as working gas during cutting.

However, it will be most desirable if electrode wear can be reduced. In particular, in the case of an oxygen plasma with large current of about 300 A, the life of the hafnium electrode is shortened, down to about two hours; the increase in running costs and lowered working efficiency resulting from the need for frequent electrode replacement cannot therefore be neglected.

SUMMARY OF THE INVENTION

An object of the invention is therefore to provide, in plasma cutting, a novel working gas supply technique whereby wear of the nozzle and/or electrode can be reduced.

A further object of the invention is to provide a novel gas supply system for keeping the working gas composition constant during plasma cutting.

In a plasma cutting method or device according to a first aspect of the present invention, nitrogen gas, air, or a mixed gas of nitrogen concentration higher than that of air is supplied as working gas between the electrode and nozzle when the pilot arc is ignited (in a pre-flow interval); and then, after the pilot arc has shifted to the main arc, a mixed gas containing oxygen and nitrogen is supplied as a working gas during cutting of the work using this main arc (in a main flow interval).

With this method of plasma cutting, since, when the pilot arc is ignited, working gas of high nitrogen concentration is employed, wear of the electrode and/or nozzle is reduced and, since, during cutting, instead of pure oxygen, mixed gas containing oxygen and nitrogen is employed as a working gas, wear of the electrode is suppressed. Furthermore, since, according to the experiments and studies of the inventor, in plasma cutting, the purity of the oxygen of the working gas does not have the critical influence on cutting quality that it was previously thought to have, even though the oxygen concentration is somewhat lowered by addition of nitrogen, electrode wear can be lowered without substantially lowering cutting quality.

As the electrode material, a metallic material wherein the melting point of the oxide and nitride are higher than that of the pure metal is preferable. In a preferred embodiment, hafnium, zirconium or an alloy of these is employed. As for hafnium and zirconium, their oxides have a melting point over 2800° C., and their nitrides have a melting point even higher, more than 3000° C. When such electrode material is employed, the method of plasma cutting of the present invention manifests particularly excellent benefits. The reason for this is that, since mixed gas containing oxygen and nitrogen is employed during cutting, the electrode surface is converted to nitride, having a high melting point, thereby further increasing its durability.

In a preferred embodiment, the oxygen concentration of the mixed gas that is supplied during cutting is 70–95 mol %, and the nitrogen concentration is 30–5 mol %. In particular, it is desirable that the oxygen concentration is more than 80 mol % while the nitrogen concentration is more than 5–20 mol %. So long as the oxygen concentration is more than 70 mol %, the lowering of cutting quality can be neglected and so long as the nitrogen concentration is more than 5 mol %, in particular where the electrode material is hafnium or zirconium, the benefit of excellent reduction of electrode wear, similar to that obtained with pure nitrogen, can be obtained.

In a preferred embodiment, nitrogen, oxygen, or a mixed gas of high nitrogen concentration above that of air is supplied as a working gas also when the main arc is about to be extinguished after completion of cutting (the post-flow interval). By this means, in particular when the electrode material is hafnium or zirconium, the electrode surface ends up as a nitride of extremely high melting point, so electrode wear on igniting of the pilot arc in the next cutting process is suppressed.

In a plasma cutting method or device according to a second aspect of the present invention, hafnium, zirconium or an alloy of these is employed as electrode material, and, in the main flow interval during cutting, mixed gas whose oxide concentration is 70–95 mol % and whose nitrogen concentration is 30–5 mol % is supplied as working gas. With this method of plasma cutting, stability of the electrode during cutting is achieved thanks to the nitride of extremely high melting point. Also, excellent cutting quality is maintained.

A gas supply system for a plasma torch according to a third aspect of the present invention comprises a gas flow path whereby gas flows to the plasma torch from a gas source, a flow rate adjustment valve for setting the gas flow rate provided on this gas flow path, and a constant differential pressure valve to maintain the differential pressure before and after the flow rate adjustment valve constant.

With this gas supply system, even if gas flow is facilitated by deterioration of the nozzle of the plasma torch on commencement of cutting or during cutting (for example the nozzle diameter becoming wider due to the pilot arc) or pressure loss within the torch (i.e. lowering of the resistance to the gas current) due to electrode wear, the differential pressure before and after the flow rate adjustment valve is maintained constant, so the gas flow rate is maintained constant. Consequently, whereas conventionally, on occurrence of nozzle deterioration or electrode wear of the plasma torch, the gas flow rate was increased, lowering cutting quality and so necessitating immediate replacement of the nozzle etc., with the present invention, even if there is some deterioration of the nozzle or electrode wear, the gas flow rate is not increased, so cutting quality is not so severely lowered as conventionally; this therefore makes it possible to delay replacement of consumables such as the nozzle. That is, the life of consumables can be substantially extended.

A gas supply system for a plasma torch according to a fourth aspect of the present invention for supplying a mixed gas of a plurality of gases to the plasma torch from a plurality of gas sources comprises: a plurality of single gas flow paths whereby respective streams of gas flow to the plasma torch from the plurality of gas sources, and which merge upstream of said plasma torch to form a mixed gas flow path; flow rate adjustment valves for setting respective gas flow rates provided on each of the single gas flow paths; and constant differential pressure valves that act to maintain constant the differential pressure before and after each flow rate adjustment valve.

With this gas supply system for mixed gas, in addition to the advantages of the gas supply system described above, the advantage is obtained that the respective gas concentrations of the mixed gas can be kept constant. If this gas supply system is utilized in a supply system for mixed gas including oxygen and nitrogen in a plasma cutting method or device as described above, the concentrations of oxygen and nitrogen can be maintained at optimum values throughout cutting, so it is possible to ensure the benefit of reducing electrode wear whilst maintaining excellent cutting quality, as described above.

In a preferred embodiment, while the nitrogen/oxygen mixed gas supply system of construction as described above extends from the oxygen gas source and nitrogen gas source, a further nitrogen gas supply system extends separately from the nitrogen gas source. Thus, the nitrogen gas supply system and supply system for nitrogen/oxygen mixed gas merge upstream of the plasma torch in a mode such that if the nitrogen/oxygen mixed gas supply system is opened the nitrogen gas supply system is automatically blocked. Thanks to this arrangement, when for example the shift takes place from the pilot arc to the main arc, it is possible to change over from the nitrogen gas constituting the pre-flow to the nitrogen/oxygen mixed gas constituting the main flow simply by opening the supply system for the nitrogen/oxygen mixed gas.

In a preferred embodiment, there is further provided a pressure reducing valve for setting an upper limit of the pressure supplied to the plasma torch, downstream of the constant differential pressure valve of the gas supply system constituted so as to maintain constant the flow rate in the constant differential pressure valve. By this means, when gas supply is commenced for start-up of the arc, a suitably low gas pressure set by the pressure reducing valve is applied to the plasma torch instead of excessive gas pressure from the gas source; arc ignition can thereby be performed in a stable manner, and the gas flow rate after arc ignition is also stabilized in a short time. Cutting can therefore be commenced without delay.

DESCRIPTION OF THE PREFERRED EMBODIMENTS

Figure 1:
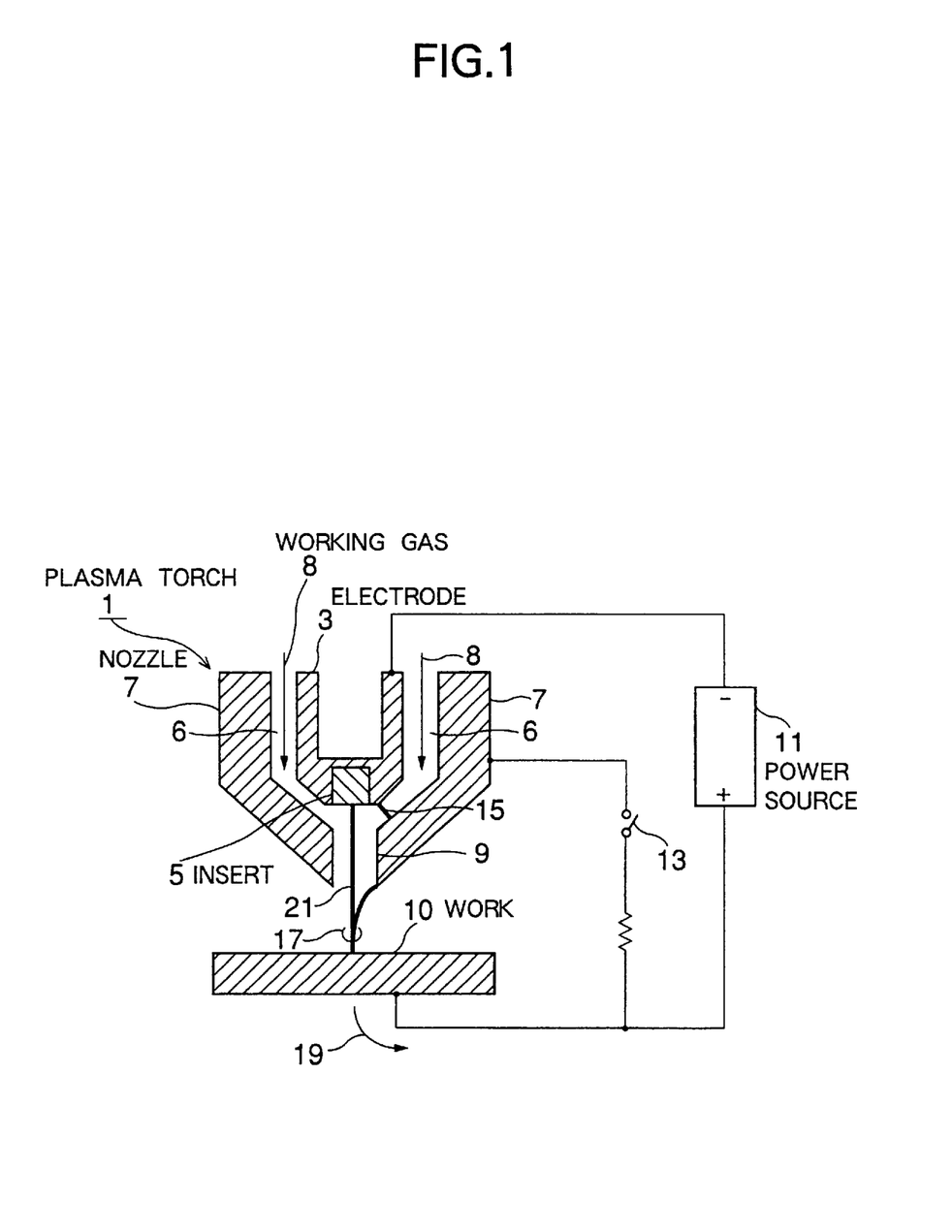
FIG. 1 is a view showing a diagrammatic layout of a plasma torch employed in a plasma cutting method according to an embodiment of the present invention.

FIG. 1 shows the diagrammatic layout of a plasma cutting device according to an embodiment of the present invention.

Plasma torch 1 is overall of approximately cylindrical shape, provided with an approximately columnar electrode 3 at its central position. At the tip constituting the plasma arc generating point of this electrode 3, there is provided a heat-resistant insert 5 made of high melting point material that is capable of withstanding the high temperatures of the plasma arc, such as hafnium (or zirconium, or an alloy of these). Hereinafter, this heat-resistant insert 5 made of hafnium will be called a "hafnium electrode". The region where electrode wear takes place is this hafnium electrode 5. Although hafnium itself has a melting point of about 2200° C., when it is turned into the oxide (Hf02), its melting point is raised to about 2800 to 2900° C., and, on conversion to the nitride (HfN) its melting point is further raised to about 3300° C. (zirconium has a similar characteristic). This property that, on conversion to the oxide or nitride the melting point is raised to about 3000° C., and in particular that the melting point of the nitride is higher than that of the oxide is utilized in reducing electrode wear, as will be described.

Electrode 3 is surrounded on its outside by an approximately cylindrical nozzle 7, a working gas passage 6 being formed between electrode 3 and nozzle 7. Working gas 8 is supplied from a working gas supply system, not shown, into working gas passage 6 from the base of the nozzle, and flows towards the nozzle tip. At the tip of nozzle 7, there is provided a nozzle orifice 9 having an aperture that is sufficiently narrow in order to greatly reduce the diameter of the plasma arc, converting it into a jet that is ejected forwards.

The work 10 that is being cut is arranged in front of torch 1. The negative terminal of a plasma power source 11 for supplying plasma current is connected to electrode 3, while its positive terminal is connected to work 10. Also, the positive terminal of plasma power source 11 is connected to nozzle 7 through a switch 13.

The procedure when cutting is commenced is, in outline, as follows. First of all, working gas 8 is passed to working gas passage 6 at a prescribed flow rate and pressure, and then switch 13 is closed so as to apply high voltage from power source 11 between electrode 3 and nozzle 7. When this happens, a pilot arc 15 is formed between electrode 3 and nozzle 7 by breakdown of the insulation provided by working gas 8. Working gas 8 is converted into plasma by the energy of pilot arc 15, and this plasma gas is ejected forwards from nozzle orifice 9. Concurrently, the pilot arc 15 is pushed by the plasma gas current so that it links up with the work 21 (moving arc 17) by passing through nozzle orifice 9. At this point, switch 13 is opened in response to the current 19 flowing through work 10, so that main plasma arc 21 is established between electrode 3 and work 10. After this, cutting of work 10 by this main arc 21 is commenced.

Figure 2:
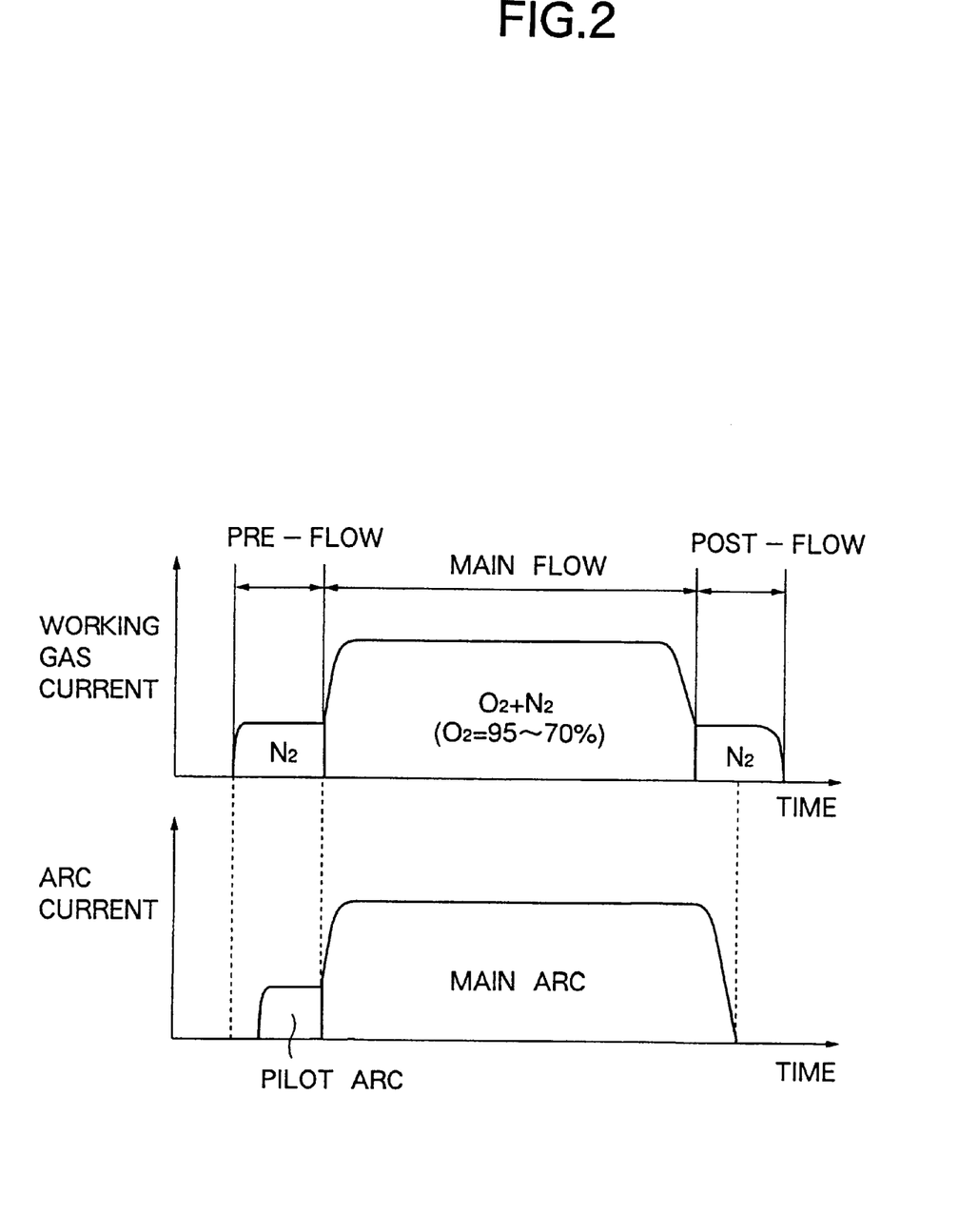
FIG. 2 is a time chart illustrating a first example of a method of supplying working gas from the commencement of cutting until its completion, together with the change of arc current.

FIG. 2 shows an example of the method of supply of working gas to torch 1 from commencement until termination of cutting, together with the change of arc current.

As shown in FIG. 2, the working gas current is divided into three types: "pre-flow", "main flow" and "Post-flow". The pre-flow current flows in the interval from immediately prior to ignition of the pilot arc up to the shift of the pilot arc into the main arc (hereinafter this is called "the pilot arc ignition interval"). The main flow current flows in the interval from the shift of the pilot arc to the main arc while cutting is performed (hereinafter this will be termed "during cutting"). The post-flow current flows in the interval from immediately prior to extinction of the main arc after termination of cutting until the temperature of the hafnium electrode after the main arc has been extinguished drops to a temperature such that no oxidation reaction takes place (hereinafter this will be referred to as "during termination of cutting").

As shown in FIG. 2, during the pilot arc ignition interval, pure nitrogen gas is supplied as pre-flow to torch 1 at a small flow rate and low pressure. During the cutting, mixed gas of oxygen and nitrogen is supplied as main flow to torch 1 at comparatively large flow rate and high pressure. The oxygen concentration in this mixed gas is 70 to 95 mol % (preferably at least 80 mol %) and the nitrogen concentration is 30 to 5 mol % (preferably at least 5 to 10 mol %). When cutting is finished, from immediately prior to the extinction of the main flow, pure nitrogen gas is supplied as post-flow in the same way as in the case of the pre-flow at comparatively small flow rate and low pressure.

During the pilot arc ignition interval, since the pilot arc is formed in pure nitrogen gas that contains essentially no oxygen, wear of the nozzle and hafnium electrode is reduced. Also, due to the flow of pure nitrogen gas when cutting is terminated, the surface of the hafnium electrode ends up in a nitrided condition of high melting point, so that when the pilot arc is ignited to commence the next cutting, wear of the hafnium electrode is suppressed.

Also, since, during cutting, mixed gas consisting of oxygen gas to which nitrogen gas has been added is employed, wear of the hafnium electrode is decreased. Since, as described above, the nitride of hafnium is of higher melting point than the oxide, wear of the hafnium electrode is effectively decreased by addition of nitrogen to the working gas. According to the experiments of the inventors, there is a boundary region of about 10to 5 mol % of the nitrogen concentration in the working gas; below this boundary region, the wear of the hafnium electrode shows a critical increase, but, above this boundary region, an excellent electrode wear suppression effect that is not inferior to that of pure nitrogen gas is obtained. Furthermore, regarding cutting quality, according to the experiments of the inventors, the oxygen purity in plasma cutting is not the critical factor that was conventionally thought; it was found that, so long as the oxygen concentration is at least 70 mol % (preferably at least 80 mol %), excellent cutting quality capable of withstanding practical use can be ensured (incidentally, in laser cutting or gas cutting, there is for example a considerable difference in cutting quality between an oxygen concentration of 99.90 mol % and 99.99 mol %; thus, the oxygen purity critically affects cutting quality). Consequently, by employing a mixed gas of oxygen concentration 70 to 95 mol % (preferably at least 80 mol %) and nitrogen concentration 30 to 5 mol % (preferably at least 5 to 10 mol %), the two objects of reduction of electrode wear and excellent cutting quality can be achieved at the same time.

According to the above principles, apart from the method of supplying working gas illustrated in FIG. 2, various other methods of supplying working gas may be employed. FIG. 3 to FIG. 8 illustrate examples of other methods of supplying working gas.

Figure 3:
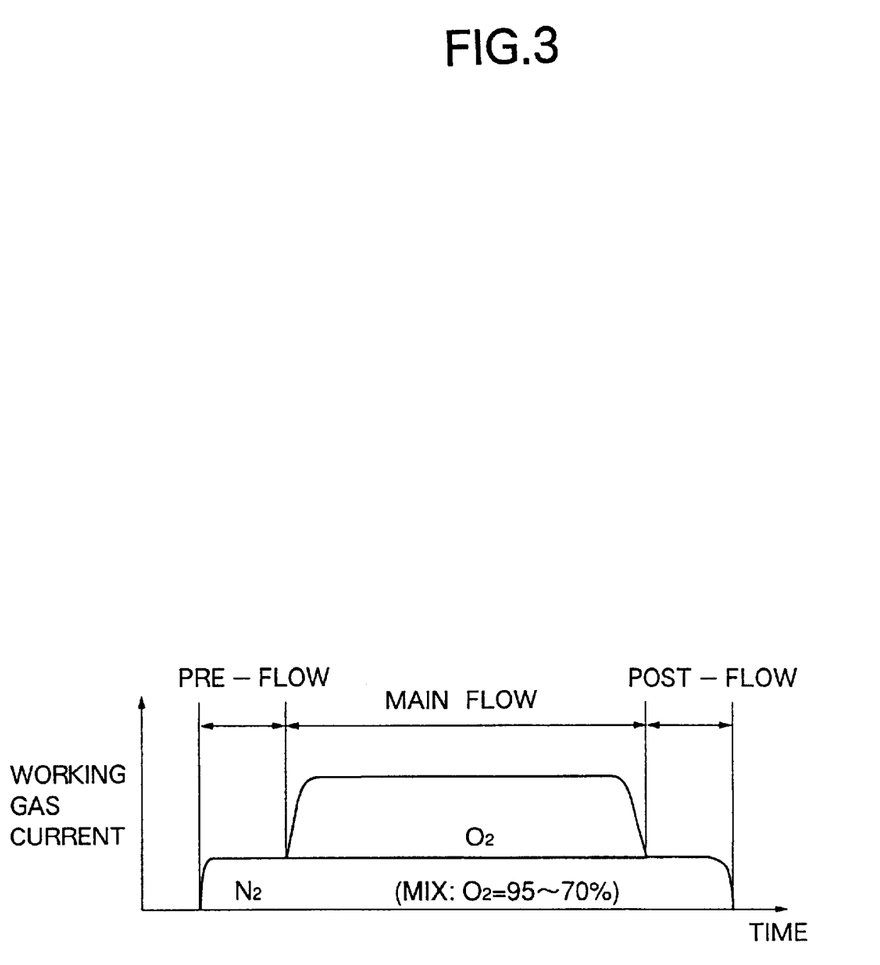
FIG. 3 is a time chart illustrating a second example of a method of supplying working gas from the commencement of cutting until its completion.

In the method of FIG. 3, the composition of the working gas that is supplied to the torch is the same as in the case of the method of FIG. 2, but the manner of flow of the gas in the working gas supply system is somewhat different. Specifically, in the method of FIG. 2, when the shift takes place from pre-flow to main flow, the pure nitrogen gas is stopped and oxygen/nitrogen mixed gas is started; when the shift takes place from main flow to post-flow, gas changeover opposite to that described above is performed (the gas supply system shown in FIG. 10, to be described, is employed). In contrast, in the method of FIG. 3, from pre-flow to main flow and post-flow, flow of pure nitrogen gas is continued and, solely during main flow, pure oxygen gas is also supplied, this pure oxygen gas and pure nitrogen gas being mixed on the upstream side of the torch (the gas supply system shown in FIG. 9, to be described, is employed).

Figure 4:
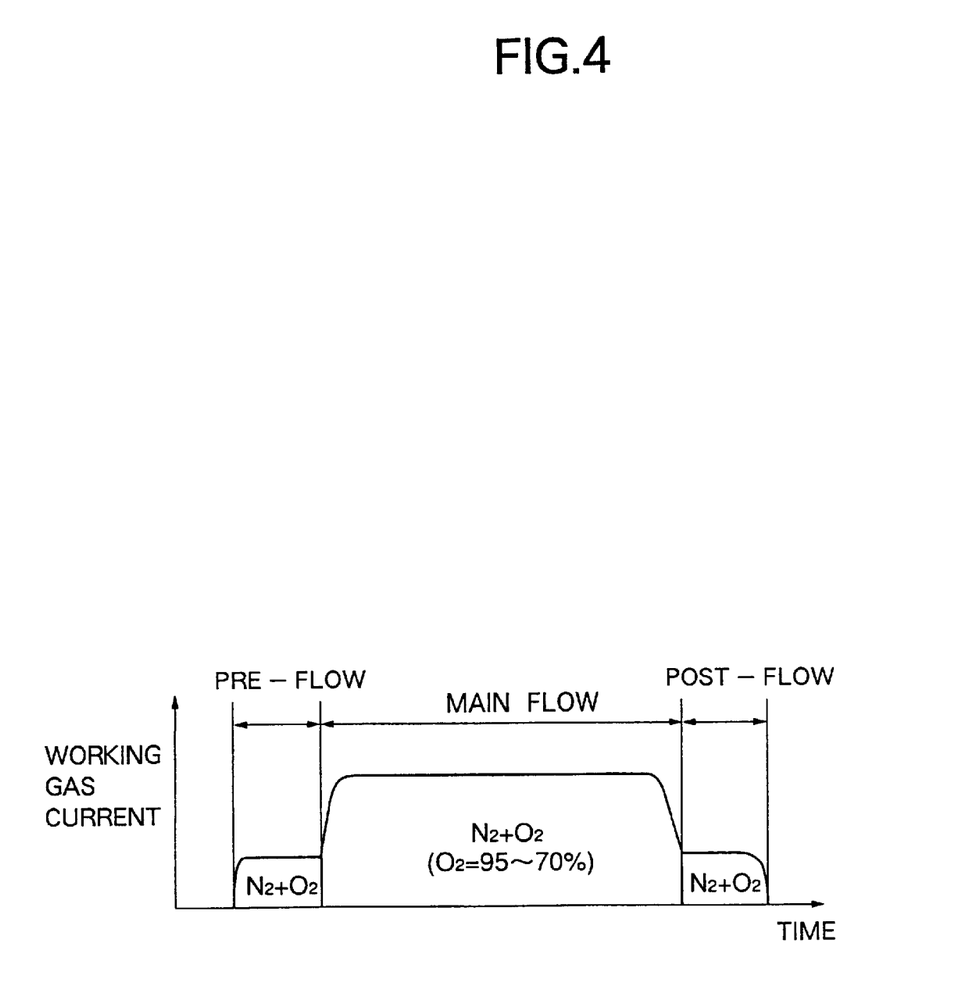
FIG. 4 is a time chart illustrating a third example of a method of supplying working gas from the commencement of cutting until its completion.

In the method of FIG. 4, a mixed gas of nitrogen and oxygen is supplied in each of pre-flow, main flow and post-flow. The concentrations of oxygen and nitrogen in main flow are identical with those in the method of FIG. 2 i.e. the oxygen concentration is 70 to 95 mol % (preferably at least 80 mol %), while the nitrogen concentration is 30 to 5 mol % (preferably at least 5 to 10 mol %). In contrast, in the case of pre-flow and post-flow, working gas having a nitrogen concentration more than that in the main flow, preferably working gas having a nitrogen concentration equal to or higher than that of air (nitrogen concentration about 80 mol %), is supplied.

Figure 5:
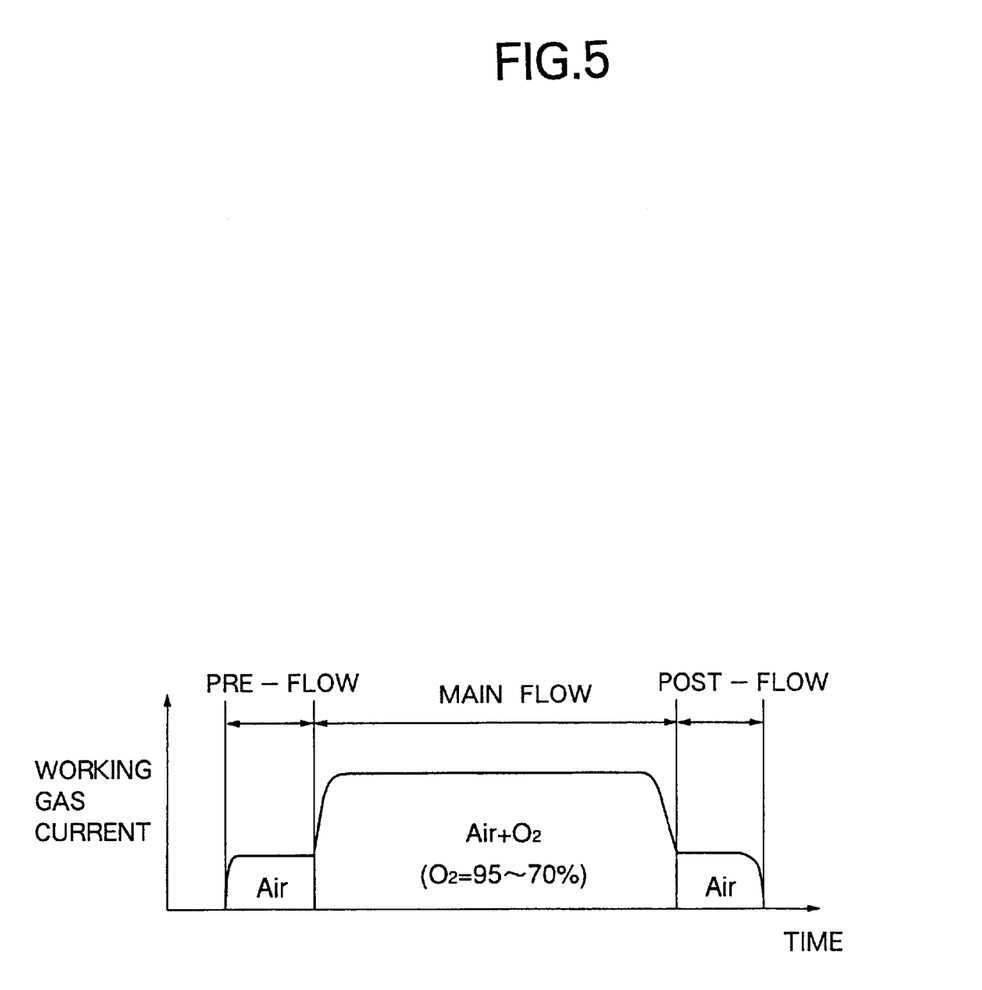
FIG. 5 is a time chart illustrating a fourth example of a method of supplying working gas from the commencement of cutting until its completion.

In the method of FIG. 5, in pre-flow and post-flow, air (nitrogen concentration about 80 mol %) is supplied, while in main flow a mixed gas of oxygen and air having oxygen and nitrogen concentrations equal to those of the main flow of FIG. 2 is supplied.

Figure 6:
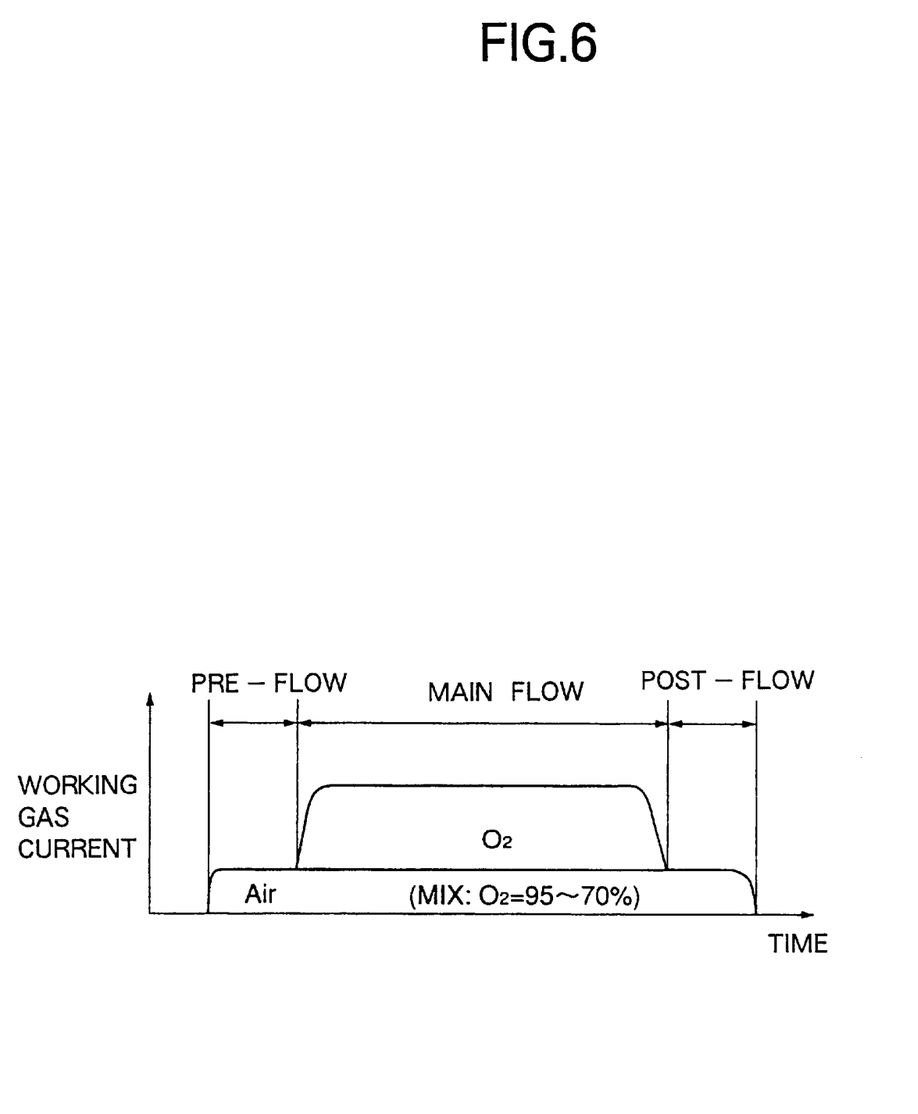
FIG. 6 is a time chart illustrating a fifth example of a method of supplying working gas from the commencement of cutting until its completion.

In the method of FIG. 6, the composition of the gas that is supplied to the torch is the same as that of the method of FIG. 5, but air continues to be supplied during pre-flow, main flow and post-flow, and, solely in main flow, pure oxygen gas is supplied, the pure oxygen gas and air being mixed upstream of the torch.

Figure 7:
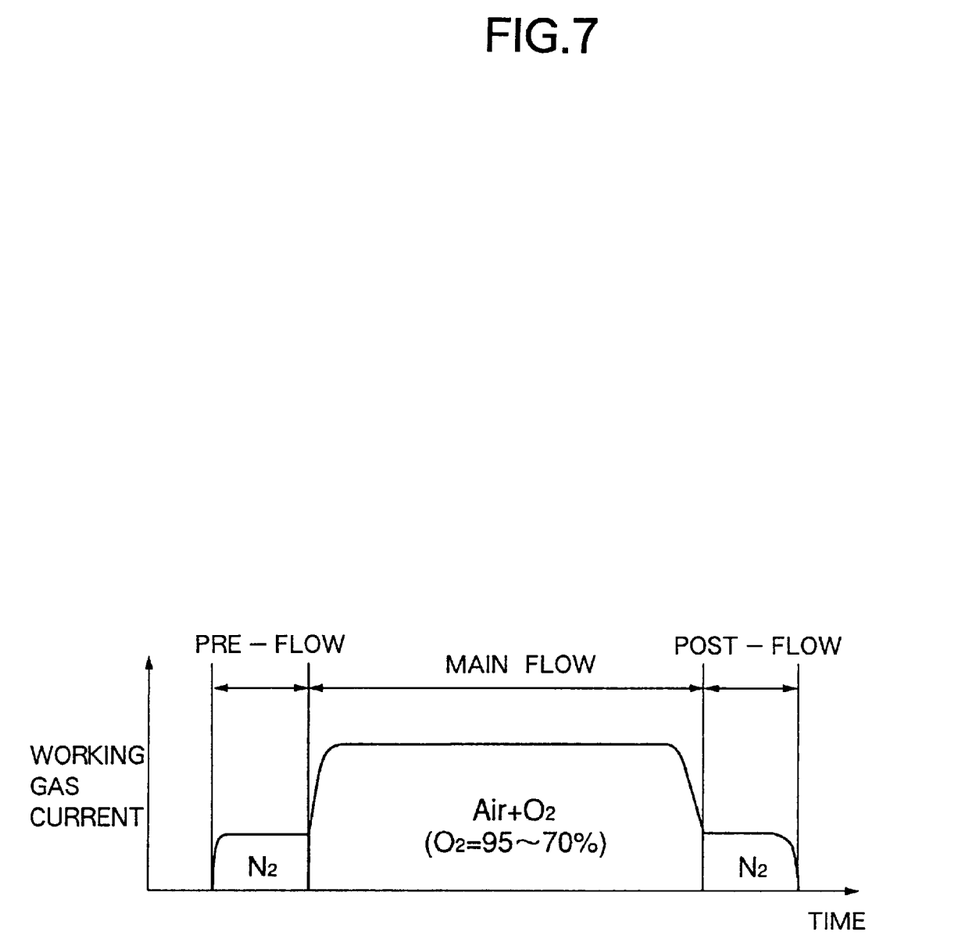
FIG. 7 is a time chart illustrating a sixth example of a method of supplying working gas from the commencement of cutting until its completion.

In the method of FIG. 7, in pre-flow and post-flow, pure nitrogen gas is supplied, but in main flow the same mixture of oxygen and air is supplied as in the case of the main flow of FIG. 5.

Figure 8:
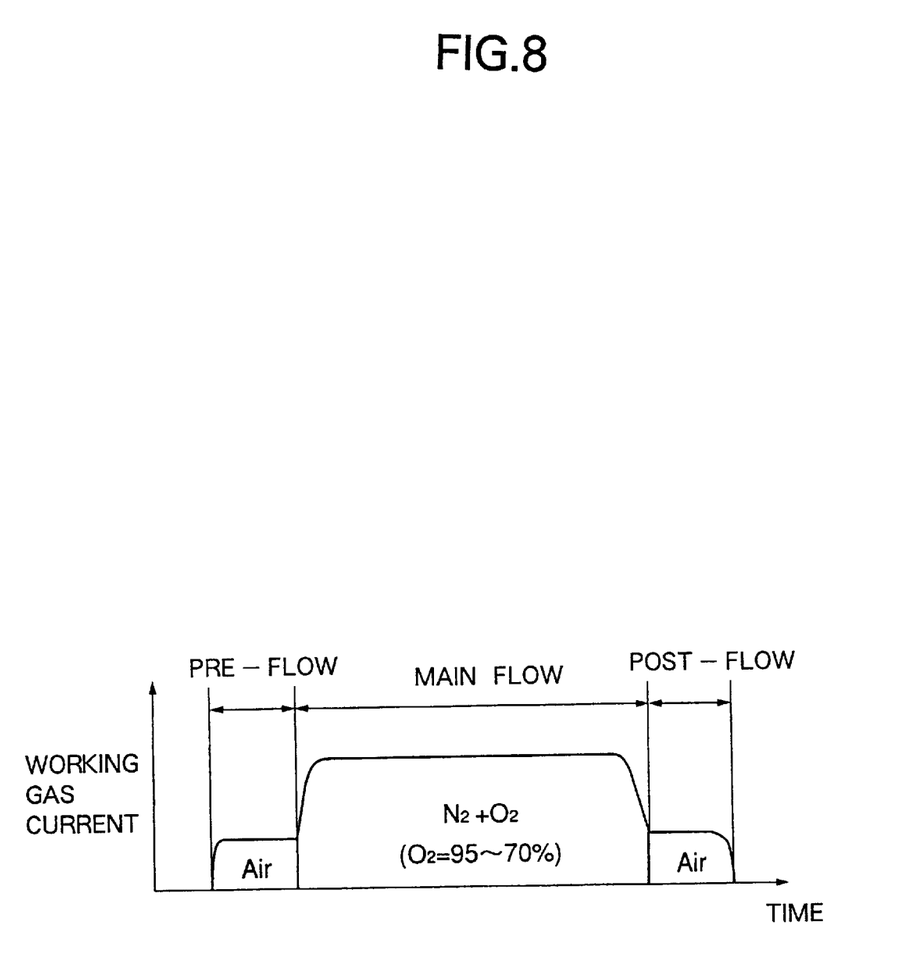
FIG. 8 is a time chart illustrating a seventh example of a method of supplying working gas from the commencement of cutting until its completion.

In the method of FIG. 8, in pre-flow and post-flow, air (nitrogen concentration about 80 mol %) is supplied, but, in main flow, the same mixed gas of oxygen and nitrogen is supplied as in the case of the main flow of FIG. 2.

In all of the above methods, since during the pilot arc generation interval and during the interval of termination of cutting, working gas containing a large nitrogen content is supplied, wear of the hafnium electrode and nozzle is reduced. During cutting, working gas containing a large oxygen content but containing a small content of nitrogen is employed, so that wear of the hafnium electrode can be reduced without substantially lowering the cutting quality. The important points in this respect are that the hafnium electrode is positively nitrided during cutting and during termination of cutting, utilizing the fact that the nitride of the hafnium electrode has a higher melting point than the oxide; and, based on the new discovery that the oxygen purity is not a critical factor in regard to cutting quality, that the oxygen concentration during cutting is somewhat lowered in a range such as not to substantially affect cutting quality, nitrogen being added instead.

Figure 9:
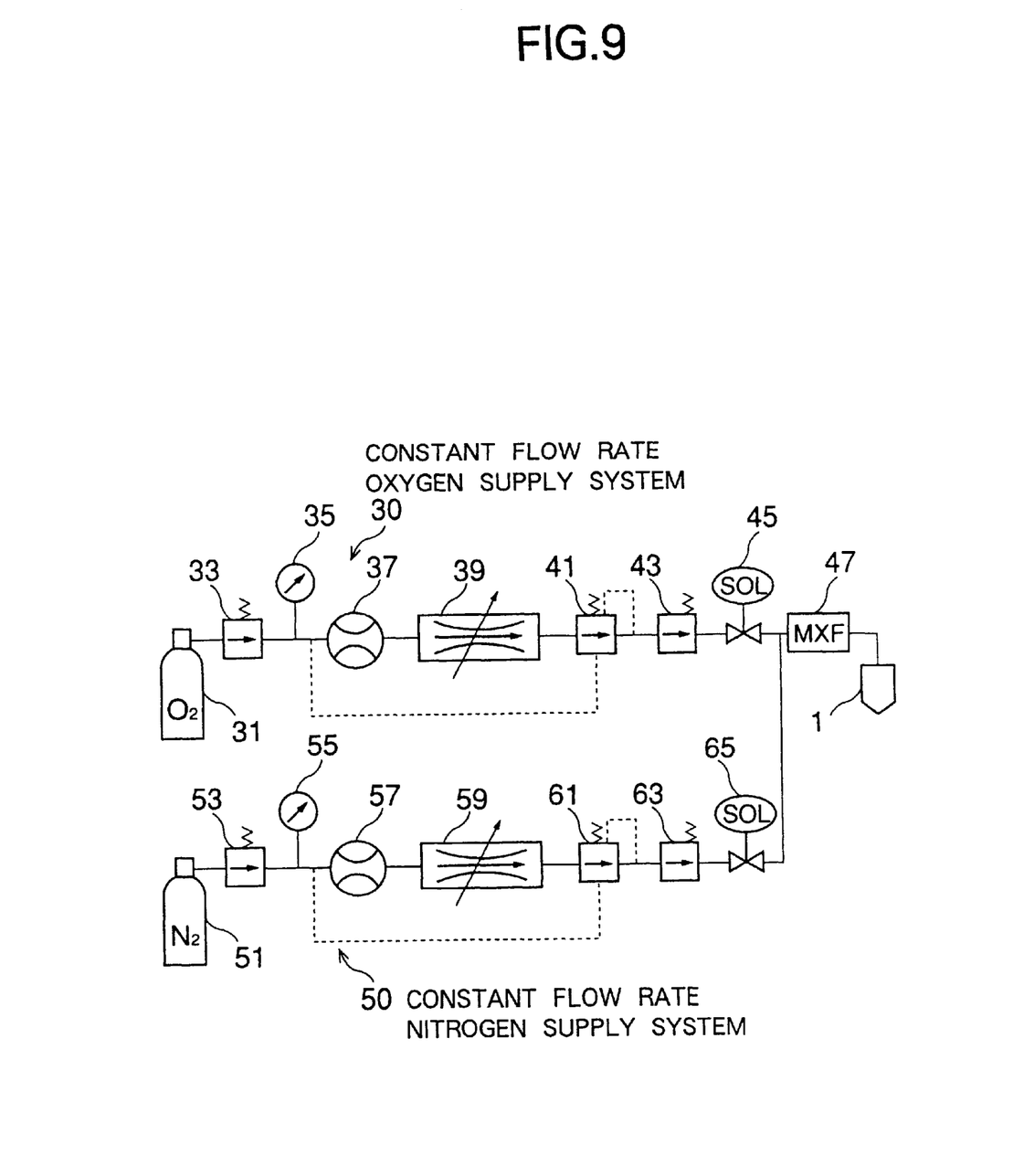
FIG. 9 is a system diagram illustrating the layout of a working gas supply system employed in the method of supplying working gas illustrated in FIG. 3.
Figure 10:
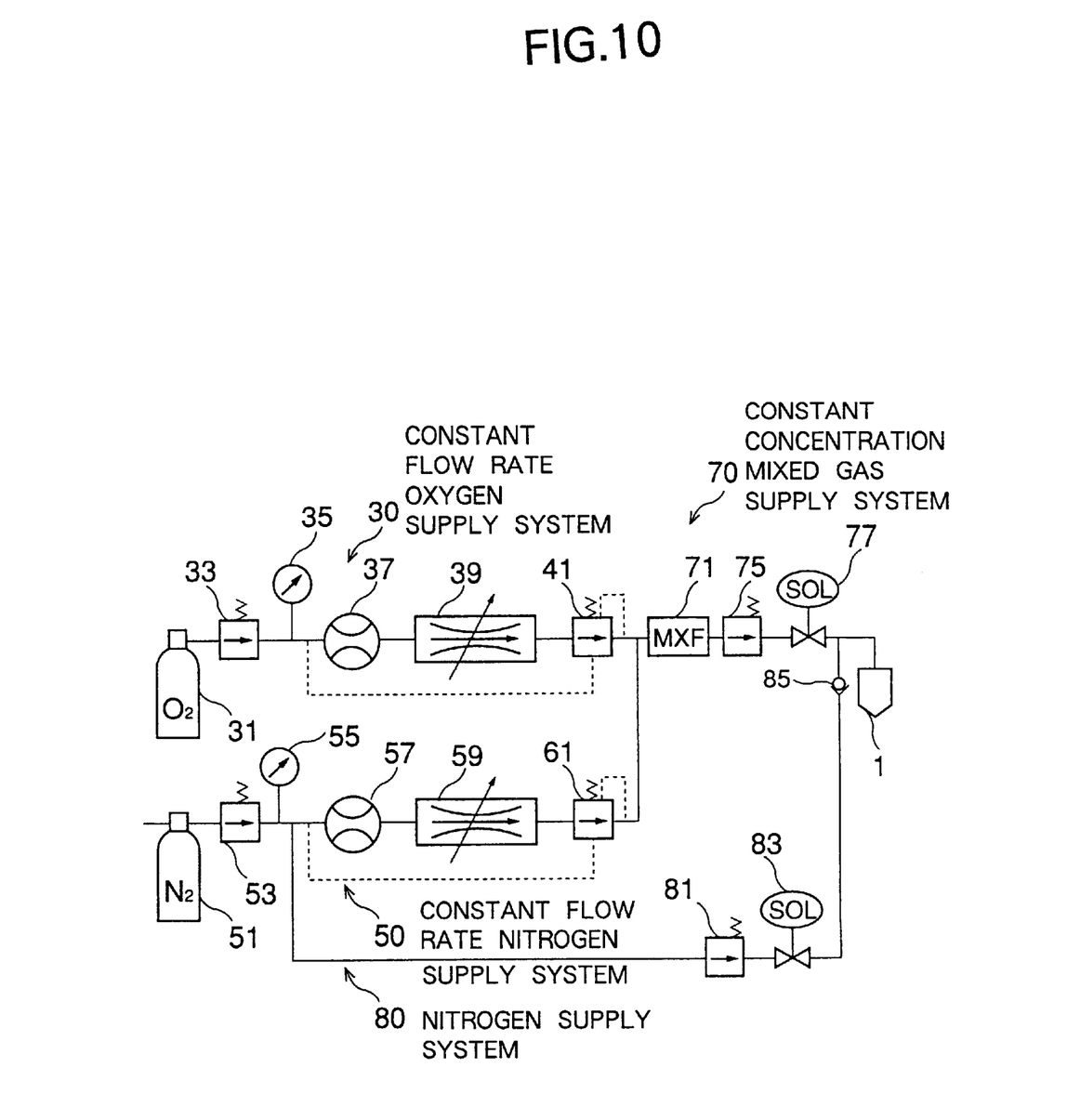
FIG. 10 is a system diagram illustrating the layout of a working gas supply system employed in the method of supplying working gas illustrated in FIG. 2.

FIG. 9 shows the construction of a working gas supply system employed in the method of working gas supply illustrated in FIG. 3. FIG. 10 shows the construction of a working gas supply system used in the working gas supply method illustrated in FIG. 2.

The working gas supply system of FIG. 9 comprises a constant flow rate oxygen supply system 30 that always supplies pure oxygen gas at constant flow rate, and a constant flow rate nitrogen gas supply system 50 that always supplies pure nitrogen gas at a constant flow rate, the oxygen and nitrogen from these two constant flow rate gas supply systems 30 and 50 being capable of being supplied to torch 1 by mixing in a mixer 45. In the respective most downstream portions of constant flow rate oxygen supply system 30 and constant flow rate nitrogen supply system 50, there are provided pressure-reducing valves 43 and 63 for setting the upper limiting value of the pressures applied to torch 1 and solenoid valves 45 and 65 that open and close each system on the downstream side thereof. Constant flow rate nitrogen supply system 50 stays open throughout all of the intervals: pre-flow, main flow and post-flow. Constant flow rate oxygen supply system 30 is open only during the interval of main flow.

The working gas supply system of FIG. 10 comprises a constant concentration mixed gas supply system 70 that supplies to torch 1 mixed gas consisting of oxygen and nitrogen having always a constant oxygen and nitrogen S concentration, and a nitrogen supply system 80 that supplies pure nitrogen gas at smaller flow rate and lower pressure than this constant concentration mixed gas supply system 70. In the respectively most downstream parts of constant concentration mixed gas supply system 70 and nitrogen supply system 80, there are provided pressure-reducing valves 75 and 81 for setting the upper limiting value of the pressure supplied to torch 1 and solenoid valves 77 and 83 that open and close the respective systems downstream thereof. Constant concentration mixed gas supply system 70 and nitrogen supply system 80 are connected to torch 1 in a mode whereby if the constant concentration mixed gas supply system 70 is open, nitrogen supply system 80 is blocked by non-return valve 83. Nitrogen supply system 80 stays open throughout all the intervals: pre-flow, main flow and post-flow. Constant concentration mixed gas supply system 70 is opened only in the main flow interval.

Constant concentration mixed gas supply system 70 is provided with a constant flow rate oxygen supply system 30 and constant flow rate nitrogen supply system 50 as shown in FIG. 9; the oxygen and nitrogen from these two constant flow rate gas supply systems 30 and 50 are mixed by mixer 71 and can be supplied through pressure-reducing valve 75.

A point worthy of note in the working gas supply systems illustrated in FIG. 9 and FIG. 10 is the construction of constant flow rate gas supply systems 30 and 50. Specifically, in order downstream from the gas cylinders 31 and 51, there are arranged pressure reducing valves 33, 53, pressure meters 35, 55, flow rate meters 37, 57, needle valves (flow rate adjustment valves) 39, 59, and constant differential pressure valves 41, 61. Constant differential pressure valves 41 and 61 have their pressure monitoring elements connected to the inlet of flow rate meters 37 and 57 and the outlet of these differential pressure valves 41 and 61, and act so as to maintain constant the differential pressure before and after the differential pressure valves i.e. the intervening needle valves 39 and 59. Consequently, even if the pressure loss of torch 1 downstream in each system changes during cutting, since the differential pressure before and after needle valves 39, 59 is constant, a constant flow rate is maintained, so the oxygen and nitrogen concentrations of the oxygen and nitrogen mixed gas are maintained constant at the correct values. Consequently, the benefits of reduction in electrode wear and maintenance of cutting quality during cutting as described above are ensured. Also, whereas previously if there was deterioration of the nozzle etc., this resulted in an increased overall gas flow rate, lowering cutting quality and therefore making it necessary to replace the nozzle, with this embodiment, even if there is some deterioration of the nozzle etc., the overall gas flow rate is maintained constant, so there is little deterioration of cutting quality. Nozzle replacement can therefore be delayed. That is, the life of components that are subject to wear, such as the nozzle, can be substantially extended.

The second point that is worthy of note is that downstream of the constant voltage difference valves 41 and 61 of the constant flow rate gas supply systems 30 and 50, there are provided pressure reducing valves 43, 63, and 75, the upper limiting value of the pressure supplied to torch 1 being set to a suitable low value. Specifically, if such a pressure reduction valve is not provided, if gas supply is stopped prior to starting the arc, the outlet pressure of the gas supply system rises to the original supply pressure (for example about 10 atmospheres at the outlet pressure of pressure reducing valves 33 and 53), so, at the instant that the solenoid valve is opened to start the arc, this high gas pressure is instantaneously applied to torch 1, making igniting of the arc difficult, or resulting in the lapse of some time before the gas flow rate stabilizes after igniting of the arc, during which interval cutting cannot be performed. However, with this embodiment, since the maximum pressure applied to the torch 1 is set to a suitable low value by the pressure reducing valves 43, 63, and 75 downstream of the constant differential pressure valves 41 and 61, stable arc ignition is possible, and, since the gas flow rate stabilizes immediately after arc ignition, cutting can be rapidly commenced.

Figure 11:
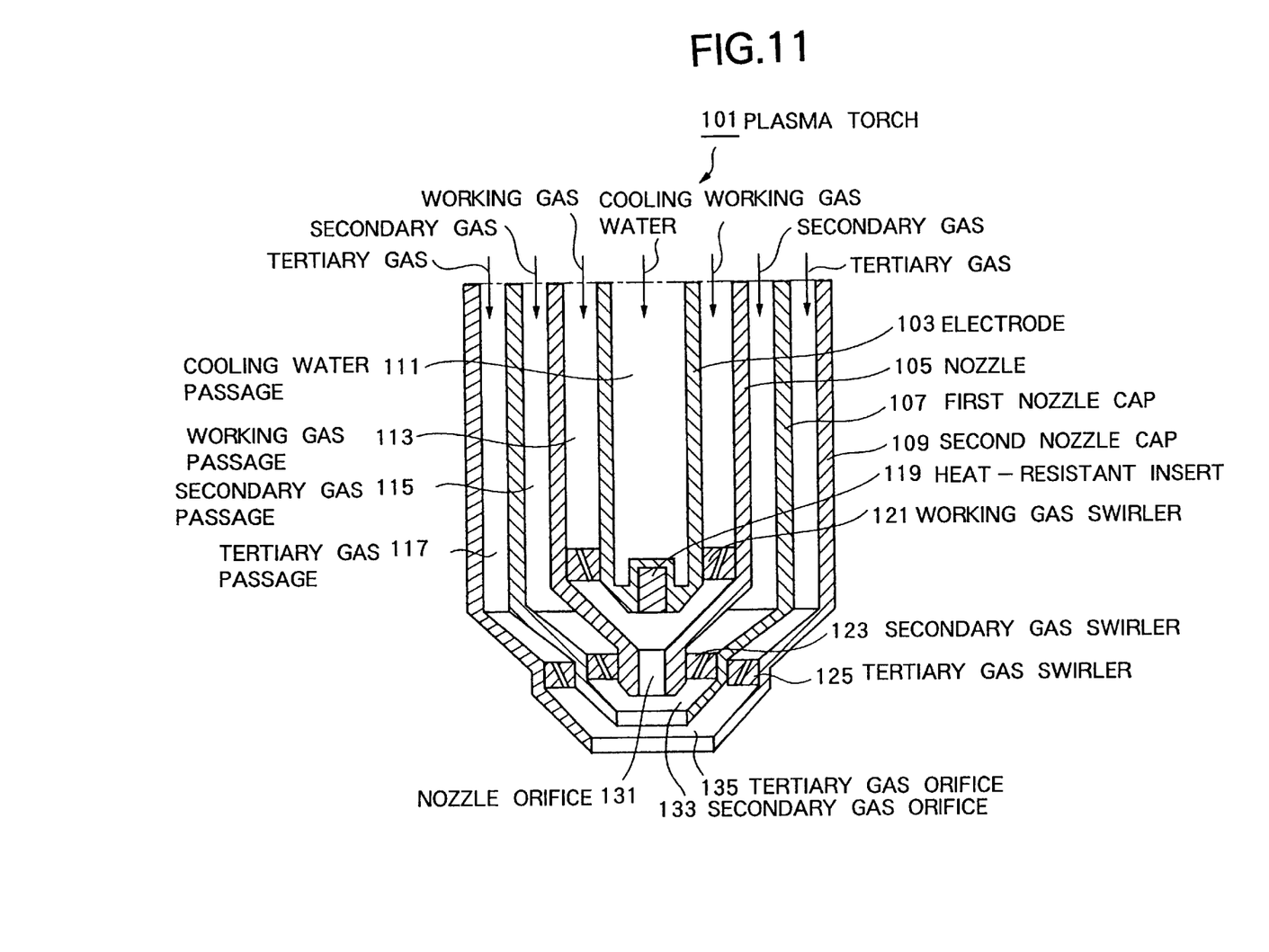
FIG. 11 is a cross sectional view illustrating a further plasma torch that can be used in a plasma cutting method according to an embodiment of the present invention.
Figure 12:
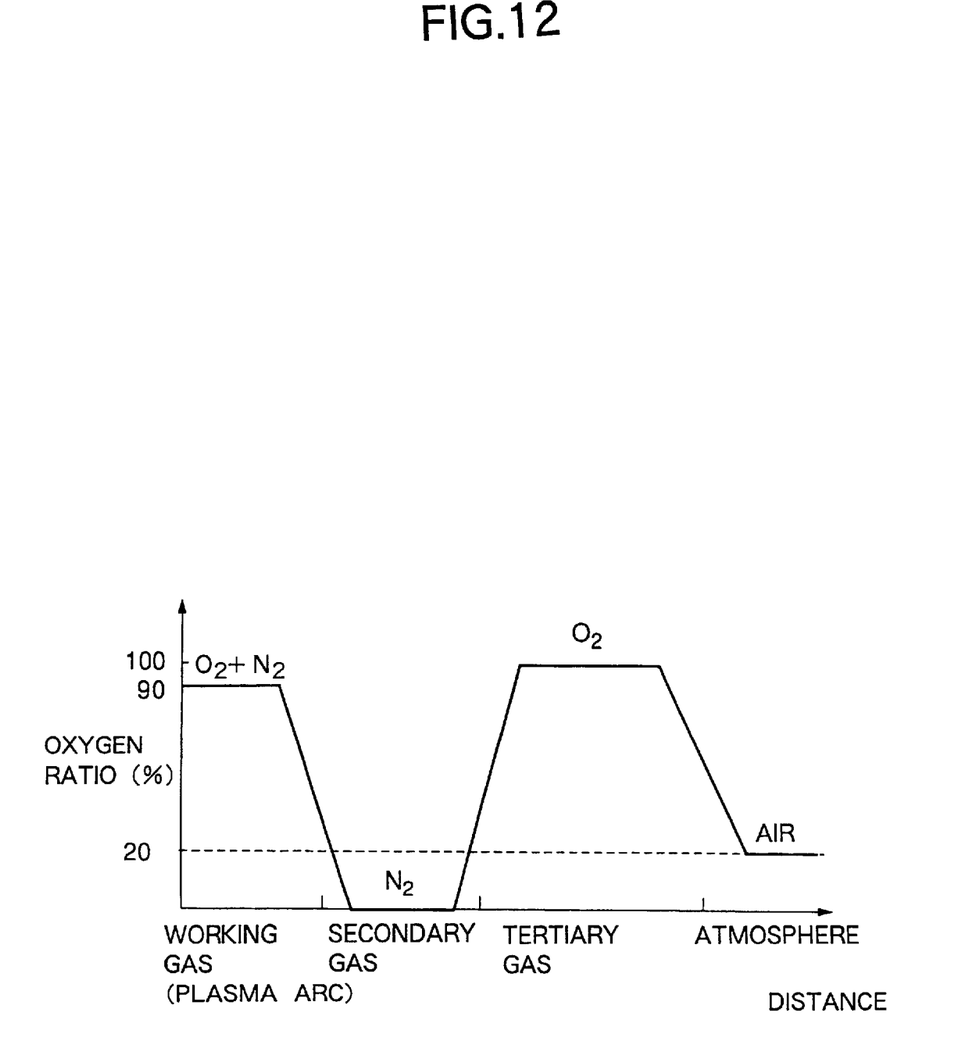
FIG. 12 is an explanatory view illustrating diagrammatically an example of the gas composition of the working gas (plasma arc), secondary gas and tertiary gas during cutting, taking distance in the radial direction from the center of the plasma arc along the horizontal axis.

FIG. 11 shows an example of the construction of another plasma torch to which the method of plasma cutting of the present invention can be applied.

This plasma torch 101 is overall of roughly multi-layered cylindrical shape; it is provided with a roughly columnar electrode 103 in its central position, the outside of this electrode 103 being covered by a roughly cylindrical nozzle 105. The outside of nozzle 105 is covered by a roughly cylindrical first nozzle cap 107. Furthermore, the outside of first nozzle cap 107 is covered by a roughly cylindrical second nozzle cap 109. The two nozzle caps 107 and 109 are electrically insulated from nozzle 105.

Electrode 103 is provided in its interior with a cooling water passage 111 through which is passed cooling water. At the tip portion constituting the generating point of this plasma arc, there is provided a heat-resistant insert 119 made of hafnium or zirconium etc.

Between electrode 103 and nozzle 105, there is formed a working gas passage 113; by means of a working gas supply system, not shown, the working gas is supplied from the base end of the torch into the working gas passage 113 and flows towards the tip of the torch. At some point along the working gas passage 113, there is fitted in a working gas swirler 121 being ring-shaped, so that the working gas acquires a rotary flow when it passes through this working gas swirler 121. At the tip of nozzle 105, there is provided a nozzle orifice 131 having an aperture that is sufficiently narrow to considerably reduce the diameter of the plasma arc, converting it into a jet, which is ejected forwards. Nozzle 105 is further provided with a cooling water passage for cooling this, but this is not shown in FIG. 11.

Between nozzle 103 and first nozzle cap 107, there is formed a secondary gas passage 115. Secondary gas is supplied by means of a secondary gas supply system, not shown, from the base end of the torch into secondary gas passage 115 and flows towards the tip of the torch. An annular secondary gas swirler 123 is fitted in at some point along secondary gas passage 115, so that when the secondary gas current passes through this secondary gas swirler 123, rotary flow is imparted to it. The direction of rotation of the secondary gas rotary flow and the direction of rotation of the working gas rotary flow are the same. At the tip of first nozzle cap 107, there is formed a secondary gas orifice 133 whereby the secondary gas is ejected. The diameter of this secondary gas orifice 133 is larger than the aperture of nozzle orifice 131. That is, this secondary gas orifice 133 is an annular aperture surrounding nozzle orifice 131.

Between first nozzle cap 107 and second nozzle cap 109, there is formed a tertiary gas passage 117. Tertiary gas is supplied by means of a tertiary gas supply system, not shown, from the base end of the torch into tertiary gas passage 117 and flows towards the tip of the torch. An annular tertiary gas swirler 125 is fitted in at some point along tertiary gas passage 117, so that the tertiary gas flow becomes a rotary flow on passing through this tertiary gas swirler 125. The direction of rotation of the rotary flow of the tertiary gas is the same as the direction of rotation of the rotary flow of working gas. At the tip of second nozzle cap 109, there is provided a tertiary gas orifice 135 whereby the tertiary gas is ejected. The aperture of this tertiary gas orifice 135 is larger than the aperture of secondary gas orifice 31. That is, tertiary gas orifice 135 is an annular aperture surrounding secondary gas orifice 133.

Regarding nozzle 105, first nozzle cap 107 and second nozzle cap 109, these represent three types of components of cylindrical shape having a gas orifice and surrounding electrode 103, but it should be noted that, in this specification, the term "nozzle" and the term "nozzle cap" are used to designate components having completely different roles. Specifically, the "nozzle" is a component having the gas aperture of smallest diameter in order to restrain and reduce the diameter of the plasma arc; all of the gas (even if there are a plurality of streams thereof) that is supplied from the upstream side (inside) of the "nozzle" is converted into plasma and, in this sense, is termed working gas or plasma gas. In contrast, the "nozzle cap" is present on the downstream side (outside) of the "nozzle" and has a gas orifice of larger aperture than the gas orifice of the nozzle; thus, the gas that is supplied to this gas orifice from the gas passage between the nozzle cap and the nozzle is not converted into plasma but surrounds the plasma arc as a shield gas. The secondary gas and tertiary gas in this embodiment function as shield gases. This is important in the understanding of the present embodiment, and should not be confused with the plasma torch having the multi-layered "nozzle" construction disclosed in for example Laid-open Japanese Patent Application No. H. 9-239545 or Laid-open Japanese Patent Application No. H. 10-314951.

Thus, in a plasma torch 101 of the above construction, during cutting, the working gas flowing in towards the vicinity of the tip of electrode 103 is turned into plasma at this point, to provide a plasma arc consisting of a high-speed jet which is considerably reduced in diameter by passage through nozzle orifice 131, and is ejected towards the front of the torch. The second gas rotary flow from the secondary gas orifice 133 is ejected to the periphery of the plasma arc towards the front of the torch, forming a secondary gas curtain at the periphery of the plasma arc. The tertiary gas rotary flow from the tertiary gas orifice 135 is ejected to the periphery of the secondary gas curtain towards the front of the torch, forming a tertiary gas curtain at the periphery of the secondary gas curtain. Thus, a gas current of triple layer construction is formed, with a working gas plasma arc at the center, whose periphery is surrounded by a secondary gas curtain, the periphery of which is surrounded by a tertiary gas curtain.

For the working gas, gas of the composition illustrated by way of example in FIG. 2 to FIG. 8 is employed. For the secondary gas, gas of oxygen concentration below that of air such as for example non-oxidative gas such as pure nitrogen, air, or gas consisting of a mixture of oxygen and nitrogen with an oxygen concentration of less than 20 mol % etc. may be employed. For the tertiary gas, gas of oxygen concentration greater than that of air such as for example pure oxygen gas, or a mixed gas of oxygen and nitrogen whose oxygen concentration is more than 20 mol %, or mixed gas of oxygen and air etc. may be employed.

FIG. 2 shows diagrammatically an example of the oxygen concentration of the secondary gas and tertiary gas, taking the distance in the radial direction from the center of the plasma arc as the horizontal axis. The example of FIG. 2 shows a case in which the working gas employed is oxygen/nitrogen (or oxygen/air) mixed gas of oxygen concentration 90 mol %, the secondary gas is pure nitrogen gas, and the tertiary gas is pure oxygen gas. As shown in the Figure, while the plasma arc (working gas) has a high oxygen concentration, outside this the oxygen concentration is temporarily lowered below that of air (secondary gas curtain), and yet further towards the outside the oxygen concentration is again enriched from that of air (tertiary gas curtain). Thus, during cutting, taking the oxygen concentration of the working gas as N1, the oxygen concentration of the secondary gas as N2, and the oxygen concentration of the tertiary gas as N3, the compositions of the respective gases are selected such as to satisfy the conditions: N1>N2 and N2<N3.

Thus, if such a gas composition is adopted during cutting, since the plasma arc is surrounded by a secondary gas curtain of low oxygen concentration, in the region of the secondary gas curtain, which is of low oxygen concentration and low temperature, the combustion reaction is suppressed and the cutting phenomenon does not proceed, so the distribution of the heat source (region of high oxygen concentration and high temperature where melting and cutting of the metal of the work can be performed) constituted by the plasma arc is sharp along the plasma arc shape surrounded by the secondary gas curtain; the problem of burning during oxygen plasma cutting is thereby reduced, enabling sharp slices to be obtained. In addition, since the periphery of the secondary gas curtain is covered by a tertiary gas curtain that is more oxygen-rich than air, oxidation of any dross remaining at the cut surface immediately after cutting or in its vicinity is promoted by the tertiary gas. When oxidation of the dross is promoted, its surface tension falls and fluidity increases, so it is easily blown away by the force of the tertiary gas jet, thereby decreasing the amount of dross adhering. Also, even if some dross solidifies and is left adhering to the cut surface, the progress of oxidation means that it can easily be exfoliated. In particular, since burning is prevented by the secondary gas curtain of low oxygen concentration, with the higher oxygen concentration of the tertiary gas, a large quantity of oxygen can be supplied to the cutting groove of the work without being subject to limitations imposed by burning. As a result, high cutting quality with no burning and little adhesion of dross is obtained.

Furthermore, with the torch 101 of FIG. 11, in addition to making the plasma arc a rotary flow, the secondary gas curtain and tertiary gas curtain at the periphery thereof are made rotary flows rotating in the same direction as the rotary flow of the plasma arc. In this way, by adjusting the strength of rotation (flow rate) of the secondary gas curtain and tertiary gas curtain, the bevel angle of the cut surface can be adjusted over a large variable range. Thanks to this bevel angle adjustment function, in addition to the improvement in cutting quality in respect of burning and dross, a desired bevel angle (typically, 0 degrees) can be obtained, thereby achieving the benefit of a further improvement of cutting quality.

Although embodiments of the present invention have been described above, these embodiments are merely given by way of example in order to describe the present invention and the present invention is not intended to be restricted to these embodiments. Consequently, the present invention may be put into practice in various modes other than the embodiments described above.

What is claimed is:

1. A method of cutting a work using a plasma arc, comprising the steps of:

supplying working gas between an electrode and nozzle;
igniting a pilot arc between said electrode and said nozzle;
shifting said pilot arc into a main arc between said electrode and the work;
cutting said work using said main arc; and
extinguishing said main arc when cutting off said work has been completed; in which said step of supplying the working gas comprises the steps of:
(1) supplying nitrogen gas, air, or a mixed gas of nitrogen concentration higher than that of air in a pre-flow interval when the pilot arc is ignited; and
(2) supplying a mixed gas containing oxygen and nitrogen in a main flow interval by supplying a mixed gas with an oxygen concentration of 70 to 95 mol % and a nitrogen concentration of 30 to 5 mol % when said work is being cut.

2. The method of plasma cutting according to claim 1 wherein said electrode is made of metallic material wherein the melting point of the oxide and nitride are higher than that of the pure metal.

3. The method of plasma cutting according to claim 1 wherein said metallic material is hafnium, zirconium or an alloy of these.

4. The method of plasma cutting according to any one of claims 1–3 wherein the oxygen concentration is 80 to 95 mol % and the nitrogen concentration is 20 to 5 mol % in the mixed gas that is supplied in said main flow interval.

5. The method of plasma cutting according to any one of claims 1–3 wherein said step of supplying working gas further comprises:
(3) a step of supplying nitrogen gas, air, or mixed gas of higher nitrogen concentration than air in a post-flow interval following said main flow interval.

6. A method of cutting a work using a plasma arc, comprising the steps of:

supplying working gas between an electrode and nozzle;
igniting a pilot arc between said electrode and said nozzle;
shifting said pilot arc into a main arc between said electrode and the work;
cutting said work using said main arc; and
extinguishing said main arc when cutting of said work has been completed; in which:
said electrode is made of hafnium, zirconium or an alloy of these; and
said step of supplying working gas consists in supplying in said main flow interval when said work is being cut a mixed gas of oxygen concentration 70 to 95 mol % and nitrogen concentration 30 to 5 mol %.

7. A plasma cutting device for cutting a work using a plasma arc, comprising:

a plasma torch having an electrode and a nozzle;
a gas supply system that supplies working gas between said electrode and said nozzle of said plasma torch; and
a plasma power source for igniting a pilot arc between said electrode and said nozzle, then establishing a main arc between said electrode and the work, maintaining said main arc during cutting of said work, and extinguishing said main arc on completion of cutting of said work; in which
said gas supply system
(1) supplies nitrogen gas, air, or a mixed gas of higher nitrogen concentration than air in a pre-flow interval when the pilot arc is ignited; and
(2) supplies a mixed gas containing oxygen and nitrogen in the main flow interval by supplying a mixed gas with an oxygen concentration of 70 to 95 mol % and a nitrogen concentration of 5 to 30 mol % when said work is being cut.

8. The plasma cutting device of claim 7 wherein said electrode is made of hafnium, zirconium or an alloy of these.

9. The plasma cutting device of claim 7 or 8 wherein the oxygen concentration is 80 to 95 mol % and the nitrogen concentration is 20 to 5 mol % in the mixed gas that is supplied in said main flow interval.

10. The plasma cutting device of claims 7 or 8 wherein said gas supply system
(3) supplies nitrogen gas, air, or mixed gas of higher nitrogen concentration than air in a post-flow interval following said main flow interval.

11. A plasma cutting device for cutting a work using a plasma arc, comprising:

a plasma torch having an electrode and nozzle;
a gas supply system that supplies working gas between said electrode and said nozzle of said plasma torch; and
a plasma power source for igniting a pilot arc between said electrode and said nozzle, then establishing a main arc between said electrode and the work, maintaining said main arc during cutting of said work, and extinguishing said main arc on completion of cutting of said work;
said electrode being made of hafnium, zirconium or an alloy of these; and
said gas supply system supplying a mixed gas of oxygen concentration 70 to 95 mol %, and nitrogen concentration 30 to 5 mol % in the main flow interval during cutting of said work.

12. A gas supply system for supplying gas to a plasma torch from a gas source, comprising:

a gas flow path whereby gas flows from said gas source to said plasma torch;
a flow rate adjustment valve for setting the gas flow rate, provided on said gas flow path; and
a constant differential pressure valve provided on said gas flow path so as to maintain the differential pressure before and after said flow rate adjustment valve constant.

13. A gas supply system for supplying a mixed gas to a plasma torch from a plurality of gas sources, comprising:

a plurality of single gas flow paths whereby respective streams of gas flow to said plasma torch from said plurality of gas sources, and which merge upstream of said plasma torch to form a mixed gas flow path;
flow rate adjustment valves for setting respective gas flow rates provided on each of the single gas flow paths; and
constant differential pressure valves provided on each single gas flow path, that act to maintain constant the differential pressure before and after each flow rate adjustment valve.

14. The gas supply system of claim 13 further comprising an additional single gas flow path whereby a single gas is supplied to said plasma torch from one gas source, said additional single gas flow path and said mixed gas flow path merging upstream of said plasma torch in a mode whereby gas is selectively supplied from one or other of the flow paths to said plasma torch.

15. The gas supply system of any one of claims 12–14, wherein a pressure reducing valve for setting the upper limit of supply pressure to said plasma torch is further provided downstream of each constant differential pressure valve.

* * * * *